UNITED STATES PATENT OFFICE.

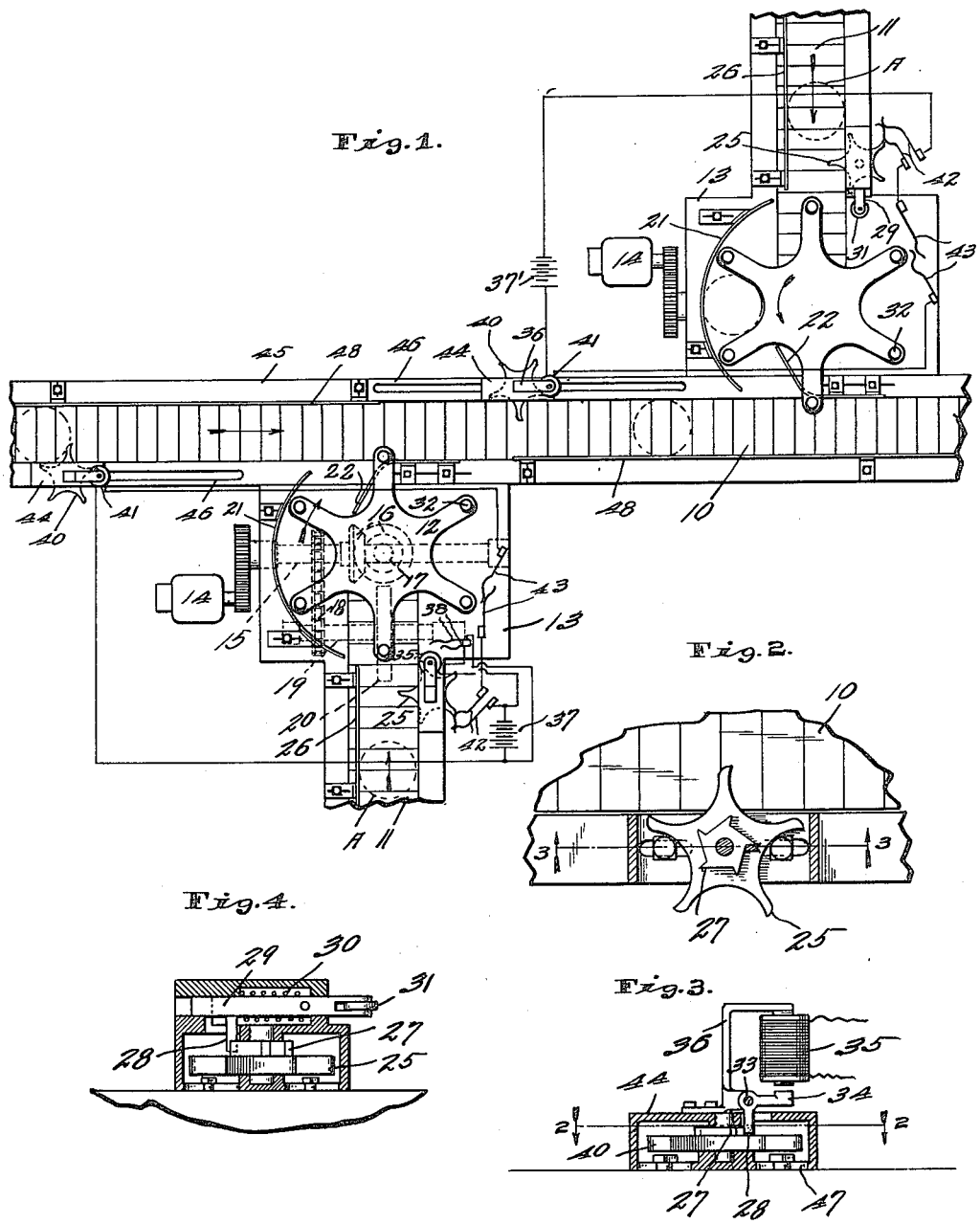

WILLIAM H. JOHNSON, OF TERRE HAUTE, INDIANA.

FEEDER-GOVERNOR.

1,281,580.

Specification of Letters Patent.   Patented Oct. 15, 1918.

Application filed January 18, 1917. Serial No. 142,982.

*To all whom it may concern:*

Be it known that I, WILLIAM H. JOHNSON, a citizen of the United States, residing at Terre Haute, in the county of Vigo and State of Indiana, have invented a new and useful Feeder-Governor, of which the following is a specification.

In many plants articles are carried on conveyers. Sometimes it is desired that the articles, such as bottles, pass from the conveyers, into the notches of a star wheel, for various purposes, and sometimes it is desired that there be branch conveyers which feed to a main conveyer as tributaries. This happens in glass plants, or in breweries, where a number of bottle machines or filling machines discharge on to their separate conveyers all of which discharge on to a main conveyer, and star wheels are used for discharging the bottles from the tributary conveyers to the main conveyers, each such star wheel overlapping upon both conveyers. Under such conditions, it is essential that the bottle or other article which discharges from the tributary conveyer on to the main conveyer shall not be interfered with by a similar bottle or other article already on the main conveyer, as a collision between two bottles or other articles might result in disaster, such as the breaking of the machine or of one or both articles, or, as when the conveyer is carrying hot bottles just formed by a bottle machine, the sticking together of the colliding bottles.

It is the object of my present invention to avoid the possibility of such collisions, between articles on a main conveyer and articles discharged thereupon from a tributary conveyer; and to provide a simple and efficient electrically operated governor for governing the passage of bottles or other articles from a conveyer into the notches of a star wheel.

The accompanying drawing illustrates my invention. Figure 1 is a plan of the main conveyer with several tributary conveyers feeding thereto, two such tributary conveyers being illustrated, showing my invention embodied therein; Fig. 2 is a section on the line 2—2 of Fig. 3 through one of the electrically released governor star wheels, showing the star wheel itself in plan; Fig. 3 is a vertical section on the line 3—3 of Fig. 2; and Fig. 4 is a vertical section through a mechanically released governor star wheel.

The main conveyer 10 is shown as of the endless chain type, and is driven in the direction of the arrow in any suitable manner. It is an impositive conveyer, carrying its load forward frictionally, so that such load can without damage slide rearward relative to the conveyer. Positively feeding this main conveyer 10 are a number of tributary conveyers 11, which may feed from either or both sides. These tributary conveyers which are also impositive conveyers, carrying their articles frictionally, receive their supply of articles, such as bottles A, from any suitable sources, such as bottle machines or bottle-filling machines. At the discharge end of each tributary conveyer 11, which is the end toward the main conveyer 10, there is a conveyer wheel or feeder star wheel 12 turning on a vertical axis over a table 13, by which feeder star wheel the positive feeding to the main conveyer is obtained. As shown, each tributary conveyer and its associated feeder star wheel are operated in common by a motor 14, which drives a shaft 15 connected by bevel gearing 16 to the vertical shaft 17 of the star wheel 12 and by a chain 18 and suitable sprockets to a shaft 19 carrying the driving sprocket 20 of the tributary conveyer 11. The feeder star wheel 12 receives the bottles or other articles from the associated tributary conveyer 11, slides them off such tributary conveyer and around on the table 13, within an arc-shaped guide rail 21, and discharges them positively from the table 13 obliquely on to the main conveyer 10 with a component of motion in the direction of travel of said main conveyer. An oblique guide rail 22 coöperates with fingers of the star wheel 12 to force the bottles or other articles positively on to the main conveyer in this oblique direction.

In order to control the passage of the bottles A into the notches of the feeder star wheel 12, I provide a governor star wheel 25 near the discharge end of each tributary conveyer 11 and overlapping thereupon from the opposite side thereof from the arc-shaped guide rail 21 and from an adjustable fence rail 26 which extends along the auxiliary conveyer 11 and serves to force the bottles A toward that side of the conveyer over which the governor star wheel 25 projects. This governor star wheel 25 acts to hold back the bottles A on its associated tributary conveyer 11 save at such times as they will be received properly into the notches of the rotating feeder star wheel 12. For this purpose, the governor star wheel 25 is provided with a series of latch teeth 27 equal in number to the fingers of such governor star wheel, and with these latch teeth a latch finger 28 coöperates to prevent the governor star wheel from turning save when the latch finger is released. Upon such release, the governor star wheel 25 is turned by the bottle as the latter is pushed along by the conveyer 11. When the latch finger 28 holds the governor star wheel 25 from turning, one of the fingers of the latter projects over the tributary conveyer 11 to stop the passage of bottles A therealong. The latch finger 28 has a normal tendency to move to latching position, and may be released either mechanically or electrically.

The mechanically released latch finger is shown in Fig. 4, and also in Fig. 1 in connection with the tributary conveyer feeding from above. Here the latch finger is carried by a plunger 29 which is spring-pressed by a spring 30 to move the latch finger 28 into latching position, so as to hold the governor star wheel 25 from turning. The plunger 29 is provided at its end with a roller 31, which is engaged by upstanding pins 32 on the successive fingers of the star wheel 12 as the latter turns so as to move the latch fingers against the spring 30 out of engagement with a latch tooth 27 to permit the stopped bottle to turn the governor star wheel 25 and to be carried along by the tributary conveyer into one of the notches of the feeder star wheel 12. The governor star wheel is operated at such a distance from the feeder star wheel that it accomplishes this properly.

The electrically released latch finger is shown in Figs. 2 and 3, and also in Fig. 1 in connection with the tributary conveyer feeding from below. Here the latch finger forms one arm of a bell-crank lever pivoted on a pin 33, the other arm 34 of such bell-crank lever constituting the armature of an electromagnet 35 suitably supported on a frame 36 which also serves as part of the magnetic circuit. The action of gravity on this armature 34 tends to move the latch finger 28 to latching position so as to hold the governor star wheel 25 from turning. The electromagnet 35 is supplied with current from any suitable source of current, such as a battery 37, which is connected in series with such electro-magnet and with a pair of normally separated spring fingers 38 which are located in position so as to be engaged and pushed together by the successive fingers on the feeder star wheel 12 as the latter turns or by upstanding pins 31 on the fingers of such feeder star wheel. The engagement of the two spring fingers 38 closes the circuit of the electro-magnet 35, and the resultant energization thereof causes the lifting of the armature 34 and the moving of the latch finger 28 to release position, so as to permit the stopped bottle to turn the governor star wheel 25 and be carried along by the tributary conveyer into one of the notches of the feeder star wheel. The spring fingers 38 and the governor star wheel 25 are so located with relation to the feeder star wheel that this is accomplished properly.

In order to prevent the bottles traveling along the main conveyer 10 from interfering with those which are fed on to the main conveyer from a tributary conveyer by a feeder star wheel 12, I provide a control star wheel 40 for each feeder star wheel
12. This control star wheel 40 is mounted at the side of the main conveyer 10 so as to overlap the latter, and is located some distance from the associated feeder star wheel 12 in the opposite direction from that toward which the main conveyer 10 travels. Its structure is the same as that of the electrically-operated governor star wheel, and it is likewise provided with latch teeth 27 which coöperate with a latch finger 28 forming one arm of a bell-crank lever of which the other arm 34 is the armature of a releasing electro-magnet 41, corresponding to the electro-magnet 35 already described. The magnet 41 may be supplied with current from either the same battery 37 which supplies the electro-magnet 35 or from a separate battery 37'. The circuit of the electro-magnet 41 is controlled by two pairs of spring fingers 42 and 43, the fingers of each pair tending to separate but being movable into engagement with each other by the points of the governor star wheel 25 or the points of the feeder star wheel 12 respectively. These two sets of spring fingers 42 and 43 are in series with each other, and with the electro-magnet 41 and the battery 37 or 37', so that it is necessary that both pairs of spring fingers 42 and 43 be in engagement with each other to cause energization of the electro-magnet 41. The spring fingers 42 are so located with respect to the associated governor star wheel 25 that they are held in engagement when such governor star wheel is latched against movement by its latch finger 28, and move out of engagement with each other while the governor star wheel 25 moves from one latched position to the next. The spring fingers 43 are so located that they are moved into engagement with each other by the feeder star wheel 12 when the spring fingers 42 are out of engagement with each other if the governor star wheel 25 is turning, so that when the governor star wheel 25 is turning one or the other of the two sets of spring fingers 42 and 43 are separated and the circuit of the electro-magnet 41 cannot be completed. Thus the circuit of the electro-magnet 41 can be completed only when the governor star wheel 25 is not moving, which is when no bottle is being fed past it by its associated tributary conveyer 11 to the feeder star wheel 12. When the electro-magnet 41 is energized, it permits the control star wheel 40 to be turned by a bottle on the main conveyer 10 if at that time there is such a bottle in engagement with such control star wheel, but save upon such energization of the magnet 41 the control star wheel 40 is latched to hold bottles back on the main conveyer 10. The control star wheel 40 is located at such a distance from its associated feeder star wheel 12 that it will hold back a bottle at the proper time to permit a bottle from the tributary conveyer passing the governor star wheel 25 and fed around by the feeder star wheel 12 on to the main conveyer to pass on to the latter without danger of collision. For this purpose, the control star wheel 40 is preferably adjustable lengthwise of the main conveyer 10, as by being mounted in a frame 44 which is fastened to the side rail 45 of the main conveyer by bolts which pass through any of a series of holes 46 in such side rail and through slots 47 in the bottom of the frame 44. Preferably, the governor star wheels 25 are mounted in a similar way so as to be adjusted longitudinally of the tributary conveyers 11. In order to force the bottles on the main conveyer into the notches of the control star wheel 40, there is an adjustable fence rail 48 opposite such control star wheel on the main conveyer frame. This fence rail 48 is adjusted toward or from the control star wheel 40 to accommodate smaller or larger bottles.

In operation the bottles are fed to the main conveyer 10 from the various tributary conveyers 11, and the spacing of the bottles on both main and tributary conveyers is often more or less irregular. Each tributary conveyer 11 discharges its bottles directly into its associated feeder star wheel 12, this discharge being governed by the governor star wheel 25 so that the bottles enter the notches of the feeder star wheel properly and are not broken between the points of the star wheel and the fence rail 26 as would otherwise at times be the case. The movements of the governor star wheel 25 are controlled by the movement of the feeder star wheel 12 as already explained, to cause the movement of the latch finger 28 either mechanically or electro-magnetically to release position at the proper time so that a bottle then against the overlapping finger of the governor star wheel 25 will just pass freely into a notch of the feeder star wheel. The bottles are carried by the feeder star wheel 12 around the curved path determined by the arc-shaped guide rail 21, traveling against the inner face of such guide rail; and when each bottle reaches the discharge end of this arc-shaped guide rail, it strikes the oblique guide rail 22 and is forced thereby and by the finger of the feeder star wheel 12 on to the main conveyer 10, which carries it along in the direction of the arrow to any desired point. The bottles from each feeder star wheel 12 enter freely on to the main conveyer 10, for the bottles already on the main conveyer and approaching the junction point of the main and tributary conveyers are held back as required by the control star wheels 40 to permit this free entrance of bottles from the tributary conveyers. This is obtained by causing the electro-magnet 41 to be energized to release the control star wheel 40 to permit a bottle to pass by on the main conveyer as each point of the feeder star wheel 12 engages the spring fingers 43 and forces them into engagement, provided the spring fingers 42 are also at the same time in engagement, which they will be unless at that time the governor star wheel 25 is being turned by the passage of a bottle past it on the tributary conveyer 11 into a notch of the feeder star wheel 12, in which latter case the electro-magnet 41 is not energized and the bottle on the main conveyer is held back.

I claim as my invention:

1. In combination, a main conveyer, a conveyer feeding to the main conveyer, a control star wheel overlapping said main conveyer and turned by the passage of articles along the latter toward the junction point with said second conveyer, a latch coöperating with said control star wheel for preventing it from being so turned, and means controlled by the passage of articles from the second conveyer to the main conveyer for controlling said latch.

2. In combination, a main conveyer, a conveyer feeding to the main conveyers, a control star wheel overlapping said main conveyer and turned by the passage of articles along the latter toward the junction point with said second conveyer, a latch coöperating with said control star wheel for preventing it from being so turned, said latch having a tendency to move to latching position, an electro-magnet for releasing said latch, and means controlled by the passage of articles from the second conveyer to the main conveyer for controlling said electro-magnet.

3. In combination, a main conveyer, a conveyer feeding to the main conveyer, a control star wheel overlapping said main conveyer and turned by the passage of articles along the latter toward the junction point with said second conveyer, a latch coöperating with said control star wheel for preventing it from being so turned, an electro-magnet controlling said latch, and means controlled by the passage of articles from the second conveyer to the main conveyer for controlling said electro-magnet.

4. In combination, a main conveyer, a feeder star wheel feeding to said main conveyer, a control star wheel overlapping said main conveyer and turned by the passage of articles along the latter toward the point to which said feeder star wheel feeds, a latch coöperating with said control star wheel for preventing it from being so turned, and means controlled by the feeding of articles by said feeder star wheel to the main conveyer for controlling said latch.

5. In combination, a main conveyer, a feeder star wheel feeding to said main conveyer, a control star wheel overlapping said main conveyer and turned by the passage of articles along the latter toward the point to which said feeder star wheel feeds, a latch coöperating with said control star wheel for preventing it from being so turned, said latch having a tendency to move to latching position, an electro-magnet for releasing said latch, and means controlled by the feeding of articles by said feeder star wheel to the main conveyer for controlling said electro-magnet.

6. In combination, a main conveyer, a feeder star wheel feeding to said main conveyer, a control star wheel overlapping said main conveyer and turned by the passage of articles along the latter toward the point to which said feeder star wheel feeds, a latch coöperating with said control star wheel for preventing it from being so turned, an electro-magnet controlling said latch, and means controlled by the feeding of articles by said feeder star wheel to the main conveyer for controlling said electro-magnet.

7. In combination, a main conveyer, a feeder star wheel feeding to said main conveyer, a control star wheel overlapping said main conveyer and turned by the passage of articles along the latter toward the point to which said feeder star wheel feeds, a latch coöperating with said control star wheel for preventing it from being so turned, and means controlled by the movements of the feeder star wheel for controlling said latch.

8. In combination, a main conveyer, a feeder star wheel feeding to said main conveyer, a control star wheel overlapping said main conveyer and turned by the passage of articles along the latter toward the point to which said feeder star wheel feeds, a latch coöperating with said control star wheel for preventing it from being so turned, said latch having a tendency to move to latching position, an electro-magnet for releasing said latch, and means controlled by the movements of the feeder star wheel for controlling said electro-magnet.

9. In combination, a main conveyer, a feeder star wheel feeding to said main conveyer, a control star wheel overlapping said main conveyer and turned by the passage of articles along the latter toward the point to which said feeder star wheel feeds, a latch coöperating with said control star wheel for preventing it from being so turned, an electro-magnet controlling said latch, and means controlled by the movements of the feeder star wheel for controlling said electro-magnet.

10. In combination, a main conveyer, a tributary conveyer, a feeder star wheel receiving articles from the tributary conveyer and feeding them to the main conveyer, a feeder governor controlled by the movements of the feeder star wheel and controlling the feeding of articles from the tributary conveyer to the feeder star wheel, and a stop device controlled jointly by the feeding of articles from the tributary conveyer to the feeder star wheel and by the movements of the feeder star wheel for obstructing the passage of articles along the main conveyer toward the point to which said feeder star wheel feeds.

11. In combination, a main conveyer, a tributary conveyer, a feeder star wheel receiving articles from the tributary conveyer and feeding them to the main conveyer, a control star wheel overlapping said main conveyer and turned by the passage of articles along the latter toward the point to which said feeder star wheel feeds, a latch coöperating with said control star wheel for preventing it from being so turned, and means controlled by the feeding of articles by said feeder star wheel to the main conveyer for controlling said latch.

12. In combination, a main conveyer, a tributary conveyer, a feeder star wheel receiving articles from the tributary conveyer and feeding them to the main conveyer, a control star wheel overlapping said main conveyer and turned by the passage of articles along the latter toward the point to which said feeder star wheel feeds, a latch coöperating with said control star wheel for preventing it from being so turned, said latch having a tendency to move to latching position, an electro-magnet for releasing said latch, and means controlled by the feeding of articles by said feeder star wheel to the main conveyer for controlling said electro-magnet.

13. In combination, a main conveyer, a tributary conveyer, a feeder star wheel receiving articles from the tributary conveyer and feeding them to the main conveyer, a control star wheel overlapping said main conveyer and turned by the passage of articles along the latter toward the point to which said feeder star wheel feeds, a latch coöperating with said control star wheel for preventing it from being so turned, an electro-magnet controlling said latch, and means controlled by the feeding of articles by said feeder star wheel to the main conveyer for controlling said electro-magnet.

14. In combination, a main conveyer, a tributary conveyer, a feeder star wheel receiving articles from the tributary conveyer and feeding them to the main conveyer, a feeder governor controlled by the movements of the feeder star wheel and controlling the feeding of articles from the tributary conveyer to the feeder star wheel, a control star wheel overlapping said main conveyer and turned by the passage of articles along the latter toward the point to which said feeder star wheel feeds, a latch coöperating with said control star wheel for preventing it from being so turned, and means controlled jointly by the movements of the feeder governor and the feeder star wheel for controlling said latch.

15. In combination, a main conveyer, a tributary conveyer, a feeder star wheel receiving articles from the tributary conveyer and feeding them to the main conveyer, a feeder governor controlled by the movements of the feeder star wheel and controlling the feeding of articles from the tributary conveyer to the feeder star wheel, a control star wheel overlapping said main conveyer and turned by the passage of articles along the latter toward the point to which said feeder star wheel feeds, a latch coöperating with said control star wheel for preventing it from being so turned, said latch having a tendency to move to latching position, an electro-magnet for releasing said latch, and means controlled jointly by the movements of the feeder governor and the feeder star wheel for controlling said electro-magnet.

16. In combination, a main conveyer, a tributary conveyer, a feeder star wheel receiving articles from the tributary conveyer and feeding them to the main conveyer, a feeder governor controlled by the movement of the feeder star wheel and controlling the feeding of articles from the tributary conveyer to the feeder star wheel, a control star wheel overlapping said main conveyer and turned by the passage of articles along the latter toward the point to which said feeder star wheel feeds, a latch coöperating with said control star wheel for preventing it from being so turned, an electro-magnet controlling said latch, and means controlled jointly by the movements of the feeder governor and the feeder star wheel for controlling said electro-magnet.

17. In combination, an impositive main conveyer, a conveyer feeding positively to the main conveyer, a stop device for obstructing the passage of articles along said main conveyer toward the junction point with the second conveyer, a latch controlling the action of said stop device, and means controlled by the feeding of articles from the second conveyer to the main conveyer for controlling said latch.

18. In combination, an impositive main conveyer, a conveyer feeding positively to the main conveyer, a stop device for obstructing the passage of articles along said main conveyer toward the junction point with the second conveyer, and an electro-magnet controlled by the feeding of articles from the second conveyer to the main conveyer for controlling the action of said stop device.

19. In combination, a main conveyer, a conveyer feeding to the main conveyer, a stop device for obstructing the passage of articles along said main conveyer toward the junction point with the second conveyer, a latch controlling the action of said stop device, said latch having a tendency to move to latching position, an electro-magnet for releasing said latch, and means controlled by the passage of articles from the second conveyer to the main conveyer for controlling said electro-magnet.

20. In combination, an impositive main conveyer, a conveyer feeding positively to the main conveyer, a stop device for obstructing the passage of articles along said main conveyer toward the junction point with the second conveyer, a latch controlling the action of said stop device, an electro-magnet controlling said latch, and means controlled by the feeding of articles from the second conveyer to the main conveyer for controlling said electro-magnet.

21. In combination, an impositive main conveyer, a feeder star wheel feeding positively to said main conveyer, a stop device for obstructing the passage of articles along said main conveyer toward the point to which said feeder star wheel feeds, a latch controlling the action of said stop device, and means controlled by the feeding of articles by said feeder star wheel to the main conveyer for controlling said latch.

22. In combination, an impositive main conveyer, a feeder star wheel feeding positively to said main conveyer, a stop device for obstructing the passage of articles along said main conveyer toward the point to which said feeder star wheel feeds, and an electro-magnet controlled by the feeding of articles from the said feeder star wheel to the main conveyer for controlling the action of said stop device.

23. In combination, a main conveyer, a feeder star wheel feeding to said main conveyer, a stop device for obstructing the passage of articles along said main conveyer toward the point to which said feeder star wheel feeds, a latch controlling the action of said stop device, said latch having a tendency to move to latching position, an electro-magnet for releasing said latch, and means controlled by the feeding of articles by said feeder star wheel to the main conveyer for controlling said electro-magnet.

24. In combination, an impositive main conveyer, a feeder star wheel feeding positively to said main conveyer, a stop device for obstructing the passage of articles along said main conveyer toward the point to which said feeder star wheel feeds, a latch controlling the action of said stop device, an electro-magnet controlling said latch, and means controlled by the feeding of articles by said feeder star wheel to the main conveyer for controlling said electro-magnet.

25. In combination, a main conveyer, a tributary conveyer, a feeder star wheel receiving articles from the tributary conveyer and feeding them to the main conveyer, a stop device obstructing the passage of articles along the main conveyer toward the point to which said feeder star wheel feeds, and means controlled jointly by the feeding of articles from the tributary conveyer to the feeder star wheel and by the movements of the feeder star wheel for controlling said stop device.

26. In combination, an impositive main conveyer, an impositive tributary conveyer, a feeder star wheel receiving articles from the tributary conveyer and feeding them positively to the main conveyer, a control star wheel overlapping said main conveyer and turned by the passage of articles along the latter toward the point to which said feeder star wheel feeds, a latch coöperating with said control star wheel for preventing it from being so turned, and means controlled by the feeding of articles by said feeder star wheel to the main conveyer for controlling said latch.

27. In combination, an impositive main conveyer, a tributary conveyer feeding thereto, a stop device for obstructing the passage of articles along said main conveyer to the junction point with said tributary conveyer, and means controlled jointly by the movements of the tributary conveyer and by the passage of articles along said tributary conveyer for controlling said stop device.

28. In combination, an impositive main conveyer, a feeder star wheel feeding to said main conveyer, a stop device for obstructing the passage of articles along said main conveyer toward the point to which said feeder star wheel feeds, and means controlled jointly by the movements of said feeder star wheel and by the feeding of articles to said feeder star wheel for controlling said stop device.

29. In combination, an impositive main conveyer, a tributary conveyer feeding thereto, a stop device for obstructing the passage of articles along said main conveyer to the junction point with said tributary conveyer, an electro-magnet controlling said stop device, and means for controlling said electro-magnet jointly by the movements of the tributary conveyer and by the passage of articles along said tributary conveyer.

30. In combination, an impositive main conveyer, a feeder star wheel feeding to said main conveyer, a stop device for obstructing the passage of articles along said main conveyer toward the point to which said feeder star wheel feeds, an electro-magnet controlling said stop device, and means for controlling said electro-magnet jointly by the movements of said feeder star wheel and by the feeding of articles to said feeder star wheel.

31. In combination, a main conveyer, a conveyer feeding positively to the main conveyer, a stop device for obstructing the passage of articles along said main conveyer toward the junction point with the second conveyer, a normally set latch controlling the action of said stop device, means for normally regularly releasing said latch intermittently to disable said stop device, and means controlled by the passage of articles from the second conveyer to the main conveyer for preventing such latch release.

32. In combination, a main conveyer, a feeder star wheel feeding to said main conveyer, a stop device for obstructing the passage of articles along said main conveyer toward the point at which said feeder star wheel feeds, a normally set latch controlling the action of said stop device, means controlled by said feeder star wheel for normally regularly releasing said latch intermittently to disable said stop device, and means for preventing such latch release when said feeder star wheel is about to discharge an article on to the main conveyer.

33. In combination, a main conveyer, a tributary conveyer, a feeder star wheel receiving articles from the tributary conveyer and feeding them to the main conveyer, a stop device for obstructing the passage of articles along said main conveyer toward the point at which said feeder star wheel feeds, a normally set latch controlling the action of said stop device, means controlled by said feeder star wheel for normally regularly releasing said latch intermittently to disable said stop device, and means controlled by the passage of articles from the tributary conveyer to the feeder star wheel for preventing such latch release.

34. In combination, a main conveyer, a tributary conveyer, a feeder star wheel receiving articles from the tributary conveyer and feeding them to the main conveyer, a stop device for obstructing the passage of articles along said main conveyer toward the point at which said feeder star wheel feeds, a latch controlling the action of said stop device, means controlled by said feeder star wheel for normally producing regular alternate setting and releasing of said latch, and means controlled by the passage of articles along said tributary conveyer to the feeder star wheel for intermitting the regularity of such alternations.

35. In combination, a main conveyer, a tributary conveyer, said two conveyers carrying articles resting thereon by friction with the articles, a feeder star wheel receiving articles from the tributary conveyer and discharging them on to said main conveyer, said feeder star wheel moving said articles by positively pushing them, a stop device for obstructing the passage of articles along said main conveyer toward the point at which said feeder star wheel feeds, a latch controlling the action of said stop device, and means controlled by the passage of articles from the tributary conveyer to the feeder star wheel for controlling said latch.

36. In combination, a main conveyer, a tributary conveyer, said two conveyers carrying articles resting thereon by friction with the articles, a feeder star wheel receiving articles from the tributary conveyer and discharging them on to said main conveyer, said feeder star wheel moving said articles by positively pushing them, a stop device for obstructing the passage of articles along said main conveyer toward the point at which said feeder star wheel feeds, a latch controlling the action of said stop device, and means controlled by the feeding of articles from the tributary conveyer to the main conveyer for controlling said latch.

37. In combination, a main conveyer, a tributary conveyer, said two conveyers carrying articles resting thereon by friction with the articles, a feeder star wheel receiving articles from the tributary conveyer and discharging them on to said main conveyer, said feeder star wheel moving said articles by positively pushing them, a stop device for obstructing the passage of articles along said main conveyer toward the point at which said feeder star wheel feeds, a latch controlling the action of said stop device, and means controlled jointly by the movements of said feeder star wheel and by the feeding of articles from said tributary conveyer to said feeder star wheel for controlling said stop device.

38. In combination, a main conveyer, said conveyer carrying articles resting thereon by friction with the articles, a feeder star wheel discharging articles on to said main conveyer, said feeder star wheel moving said articles by positively pushing them, a stop device for obstructing the passage of articles along said main conveyer toward the point at which said feeder star wheel feeds, a latch controlling the action of said stop device, and means controlled by the feeding of articles to said main conveyer by said feeder star wheel for controlling said stop device.

In witness whereof, I have hereunto set my hand at Indianapolis, Indiana, this 11th day of January, A. D. one thousand nine hundred and seventeen.

WILLIAM H. JOHNSON.